(12) United States Patent
Weiss et al.

(10) Patent No.: US 8,955,423 B2
(45) Date of Patent: Feb. 17, 2015

(54) PNEUMATIC BRAKE BOOSTER

(75) Inventors: Andreas Weiss, Bad Soden (DE); Juergen Faller, Kahl (DE); Andreas Bischoff, Bad Vilbel (DE); Volker Ickler, Kirchheim (DE); Ralf Jakobi, Floersheim (DE); Sven Mainz, Eddersheim (DE)

(73) Assignee: Continental Teves AG & Co. oHG (DE)

( * ) Notice: Subject to any disclaimer, the term of this patent is extended or adjusted under 35 U.S.C. 154(b) by 920 days.

(21) Appl. No.: 13/120,526

(22) PCT Filed: Sep. 22, 2009

(86) PCT No.: PCT/EP2009/062238
§ 371 (c)(1),
(2), (4) Date: Mar. 23, 2011

(87) PCT Pub. No.: WO2010/034701
PCT Pub. Date: Apr. 1, 2010

(65) Prior Publication Data
US 2011/0174151 A1     Jul. 21, 2011

(30) Foreign Application Priority Data

Sep. 26, 2008 (DE) .......................... 10 2008 049 167
Aug. 12, 2009 (DE) .......................... 10 2009 037 232

(51) Int. Cl.
*B60T 13/56* (2006.01)
*B60T 13/567* (2006.01)

(52) U.S. Cl.
CPC ................................. *B60T 13/5675* (2013.01)
USPC ...................................... 91/376 R; 92/169.2

(58) Field of Classification Search
CPC ..... B60T 13/56; B60T 13/563; B60T 13/567; B60T 13/5675; B60T 13/569
USPC ....................................... 92/169.2; 91/376 R
See application file for complete search history.

(56) References Cited

U.S. PATENT DOCUMENTS 4,256,016 A     3/1981  Thomas
4,270,353 A *   6/1981  Thomas et al. .............. 92/169.3
(Continued)

FOREIGN PATENT DOCUMENTS

DE     29 20 249     11/1979
DE     195 39 601    4/1997
(Continued)

OTHER PUBLICATIONS

International Search Report for PCT/EP2009/062238 issued Mar. 10, 2010.
(Continued)

*Primary Examiner* — Thomas E Lazo
(74) *Attorney, Agent, or Firm* — RatnerPrestia

(57) ABSTRACT

A tandem-type pneumatic brake booster, in particular for hydraulic vehicle brake systems, having a housing comprising a first and a second housing half shell, the interior of which is divided with the aid of a partition into a front and a rear booster chamber, wherein the partition has a centrally arranged, circular cavity, through which a control housing or a cylindrical control housing extension extends, and the partition rests sealingly against the control housing or the control housing extension by a sealing element, having a first and a second movable wall, which respectively subdivide the front and the rear booster chamber into a first low-pressure chamber and a first working chamber and into a second low-pressure chamber and a second working chamber, having at least one connecting conduit between the first working chamber and the second working chamber in order to equalize the pressure between said two working chambers.

13 Claims, 4 Drawing Sheets

(56) References Cited

U.S. PATENT DOCUMENTS

| | | | | |
|---|---|---|---|---|
| 5,076,142 | A | * | 12/1991 | Steer et al. .................. 91/369.3 |
| 5,878,650 | A | * | 3/1999 | Osterday et al. ............. 92/169.3 |
| 6,453,794 | B2 | * | 9/2002 | Castel et al. ................ 91/376 R |
| 6,588,317 | B2 | * | 7/2003 | Petin et al. .................. 92/169.3 |
| 6,755,117 | B2 | * | 6/2004 | Vermoesen et al. ......... 92/169.2 |
| 6,918,249 | B2 | * | 7/2005 | Maligne et al. ............. 91/376 R |
| 6,959,637 | B1 | * | 11/2005 | Penninger et al. .......... 91/376 R |
| 7,096,775 | B2 | * | 8/2006 | Endo et al. .................. 92/169.3 |
| 2003/0209136 | A1 | * | 11/2003 | Lorkin ........................ 91/376 R |

FOREIGN PATENT DOCUMENTS

| | | |
|---|---|---|
| DE | 198 32 357 | 1/2000 |
| DE | 698 06 446 | 11/2002 |
| DE | 101 36 379 | 12/2002 |

OTHER PUBLICATIONS

German Search Report for DE 10 2009 037 232.6 dated Mar. 10, 2010.

* cited by examiner

PNEUMATIC BRAKE BOOSTER

CROSS REFERENCE TO RELATED APPLICATIONS

This application is the U.S. national phase application of PCT International Application No. PCT/EP2009/062238, filed Sep. 22, 2009, which claims priority to German Patent Application No. DE 10 2008 049 167.5, filed Sep. 26, 2008, and German Patent Application No. DE 10 2009 037 232.6, filed Aug. 12, 2009, the contents of such applications being incorporated herein by reference.

FIELD OF THE INVENTION

The invention relates to a tandem-type pneumatic brake booster, in particular for hydraulic vehicle brake systems, having a housing comprising a first and a second housing half shell, the interior of which is divided with the aid of a partition into a front and a rear booster chamber, wherein the partition has a centrally arranged, circular cavity, through which a control housing or a cylindrical control housing extension extends, and the partition rests sealingly against the control housing or the control housing extension by means of a sealing element, having a first and a second movable wall, which respectively subdivide the front and the rear booster chamber, into a first low-pressure chamber and a first working chamber and into a second low-pressure chamber and a second working chamber, having at least one connecting conduit between the first working chamber and the second working chamber in order to equalize the pressure between said two working chambers.

BACKGROUND OF THE INVENTION

A brake booster of this kind is known from DE 195 39 601 A1, for example, which is incorporated by reference. Said brake booster has what is referred to as external air routing. For this purpose, connecting conduits formed by a rib structure in a radially outer sealing bead of a first rolling diaphragm are formed between the working chambers in the region of the connection between the housing half shells.

DE 198 32 357 A1, which is incorporated by reference, has furthermore disclosed a brake booster in which the working chambers are connected by one or more connecting conduits designed as a cylindrical sleeve. For this purpose, the cylindrical sleeve penetrates the partition and the second movable wall and has a collar, by means of which it rests against a seal fitted into an opening in the partition. In this way, the first working chamber can participate in air admission when a control valve is opened.

SUMMARY OF THE INVENTION

In the known brake boosters, the partition which divides the first working chamber from the second low-pressure chamber is placed in the housing and fixed by the first rolling diaphragm. When the brake booster is actuated, air admission to the first working chamber results in a pressure difference, and this pressure is imposed on the housing via the partition.

This imposition of a load on the housing necessarily requires a stronger design of housing. For this reason, a thicker plate is used for the housing, and this is considered disadvantageous in terms of weight and costs.

It is therefore an object of the invention to provide a brake booster which is improved in this respect.

According to aspects of the invention, the object is achieved by virtue of the fact that the connecting conduit is provided as a cylindrical sleeve which penetrates the partition and the second movable wall, said sleeve allowing forces to be deflected from the partition to a vehicle-mounted wall. As a result, the rearward-acting force arising from actuation is introduced into the vehicle-mounted wall (splash wall) via the sleeve without imposing an additional load on the housing. The partition is thus supported in a manner largely decoupled from the housing. These measures allow a significant reduction in the plate thickness of the housing. Moreover, this configuration of the air routing and deflection of forces makes it possible to simplify the design of the partition.

Deflection of forces into the vehicle-mounted wall can be accomplished in a simple manner if the sleeve is supported directly or indirectly against the second housing half shell.

Deflection of forces from the partition into the sleeve can be achieved in a simple manner if the partition is supported against a radial collar on the sleeve.

The sleeve preferably has an encircling groove for accommodating a sealing element in an end region which rests against an axial collar surrounding a cavity in the partition. In this way, complex sealing of the first working chamber can be avoided.

According to an advantageous embodiment, weight can be saved by making the partition of aluminum. However, it is equally possible to envisage making the partition of steel for force transmission to the sleeve.

A further weight saving can be achieved if the sleeve is made of plastic or aluminum. Moreover, the sleeve is simple to produce.

In a variant of the brake booster having at least one tie rod, which penetrates the housing and a cavity in the partition in order to support the housing half shells and rests by means of a collar against an inner side of the second housing half shell, provision can preferably be made for the sleeve to surround the tie rod, with the forces being deflected into the vehicle-mounted wall directly via the second housing half shell or via the collar of the tie rod.

According to an advantageous embodiment, simple positioning of the sleeve can be achieved if the tie rod has at least two ribs for centering the sleeve.

The ribs are preferably of L-shaped design with a first and a second leg, the second leg being formed integrally on the collar of the tie rod, and the sleeve resting on the second leg. The fact that the sleeve rests on the second leg ensures that there is a free flow cross section in this region.

An alternative advantageous embodiment of the invention envisages that the sleeve has at least two ribs on an inner side to ensure centering on the tie rod. The centering of the sleeve ensures correct positioning of the sleeve on the tie rod and hence air routing between the two working chambers.

For this purpose, the collar of the tie rod preferably rests against the ribs of the sleeve.

In another variant of the brake booster having at least one tubular reinforcing element, which extends through the housing and rests against an inner side of the second housing half shell by means of a contact element, wherein a screw element for fastening the brake booster on the vehicle-mounted wall is connected to the reinforcing element, provision can preferably be made for the sleeve to be supported against the contact element and to have one or more cutouts in the region of the second working chamber.

In another variant of the brake booster having fastening elements, which penetrate the second housing half shell in order to fasten the brake booster on the vehicle-mounted wall and rest by means of a head flange against an inner side of the second housing half shell, provision can furthermore preferably be made for the sleeve to be supported against the head flange of a fastening element and to have one or more cutouts in the region of the second working chamber.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
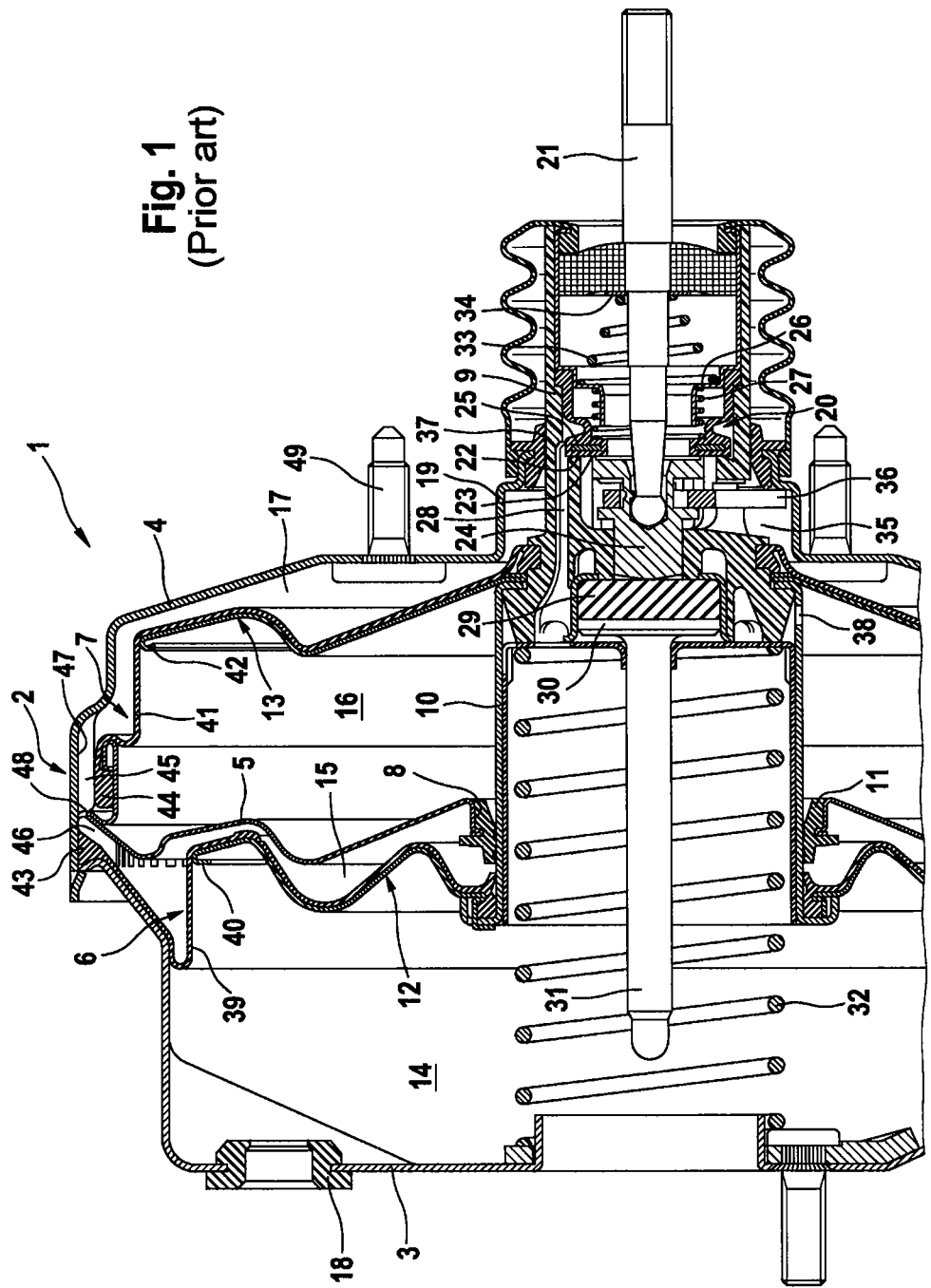
FIG. 1 shows a known brake booster in longitudinal section.

FIG. 1 shows a known tandem-type pneumatic brake booster 1 in longitudinal section, which comprises a housing 2 having a first and a second shell-shaped booster housing half or housing half shell 3, 4, which are preferably pressed together by forming measures. The interior of the housing 2 is divided with the aid of an approximately centrally arranged, fixed partition 5 into a front booster chamber 6 on the master-cylinder side and a rear booster chamber 7 on the brake-pedal side, the partition 5 having a centrally arranged, circular cavity 8, through which a control housing 9 or the cylindrical extension 10 thereof extends. The partition 5 rests sealingly against the extension 10 by means of a sealing element 11.

The front booster chamber 6 is subdivided by a first movable wall 12 into a first low-pressure chamber 14 at constant pressure and into a first working chamber 15 at a variable pressure, and the rear booster chamber 7 is subdivided by a second movable wall 13 into a second low-pressure chamber 16 and a second working chamber 17. The first housing half shell 3 is usually provided with a sealing element 18 for a low-pressure connection, by means of which the first low-pressure chamber 14 can be connected to a suitable source of low pressure, e.g. an intake manifold of the motor vehicle engine or a vacuum pump.

The second housing half shell 4 is provided with an axial portion 19 of smaller diameter, in which the control housing 9 is guided in such a way that it can be moved axially with sealing by means of a sealing ring 37. Provided in the interior of the control housing 9 is a control valve 20, which allows controlled air admission to the two working chambers 15, 17 and thereby controls the pressure difference between the low-pressure chambers 14, 16 and the working chambers 15, 17.

The control valve 20 can be actuated by an input member 21, which is connected to a brake pedal (not shown) and comprises a first sealing seat 22 formed on the control housing 9, a second sealing seat 23 formed on a valve plunger 24 connected to the input member 21, and a valve body 25, which interacts with both sealing seats 22, 23 and which is pressed against the valve seats 22, 23 by means of a valve spring 27 supported against a guide element 26. The second working chamber 17 can be connected to the first low-pressure chamber 14 by way of a conduit 28 extending along the inside of the control housing 9.

The braking force is transmitted, via a rubber-elastic reaction disk 29 resting against the end of the control housing 9 and via an output member 31 having a head flange 30, to an actuating piston of a master cylinder (not shown) of the brake system, which is attached to the low-pressure end of the brake booster 1. The input force introduced at the input member 21 is transmitted to the reaction disk 29 by means of the valve plunger 24.

A reset spring 32, which is illustrated schematically in the drawing and which is supported against the low-pressure-side end wall of the booster housing 2, holds the movable walls 12, 13 in the initial position shown. A return spring 33, which is arranged between a holding element 34 arranged on the input member 21 and the guide element 26 and the force of which ensures preloading of the valve plunger 24 and of the valve seat 23 thereof relative to the valve body 25, is furthermore provided.

Finally, to enable the second working chamber 17 to be connected to atmosphere when the control valve 20 is actuated, an approximately radially extending conduit 35 is formed in the control housing 9. The return motion of the valve plunger 24 at the end of a braking operation is limited by a transverse member 36, which rests against the booster housing 2 in the release position (shown in the drawing) of the brake booster 1.

The connection between the first and the second low-pressure chamber 14, 16 is established by means of one or more openings 38 in the extension 10 of the control housing 9, which are provided in the region between the partition 5 and the second movable wall 13.

As can be seen from FIG. 1, the movable walls 12, 13 each have a flexible rolling diaphragm 39, 41 and a diaphragm plate 40, 42, the rolling diaphragms 39, 41 each being provided radially on the outside with an encircling thickened portion or a sealing bead 43, 44 for clamping the rolling diaphragm 39, 41.

A pneumatic connection between the two working chambers 15, 17 is established by way of connecting conduits 46, which are provided in the region of the connection between the two housing half shells 3, 4. It is clear from FIG. 1 that, when the control valve 20 is actuated, air flows from the atmosphere into the second working chamber 17 via the conduit 35 in the control housing 9. Provided in the second housing half shell 4 are axially oriented bulges 45, through which the air flows onward to the constriction between an inner side 47 of the second housing half shell 4 and a radial outer side 48 of the partition 5. Via the connecting conduits 46, which are formed by a rib structure on the sealing bead 43 of the first rolling diaphragm 39, the air flows into the first working chamber 15.

Screws are provided as fastening elements 49 to enable the brake booster 1 to be fastened on the vehicle-mounted wall, said screws penetrating the second housing half shell 4 and resting by means of a head flange against an inner side of the housing half shell 4.

Figure 2:
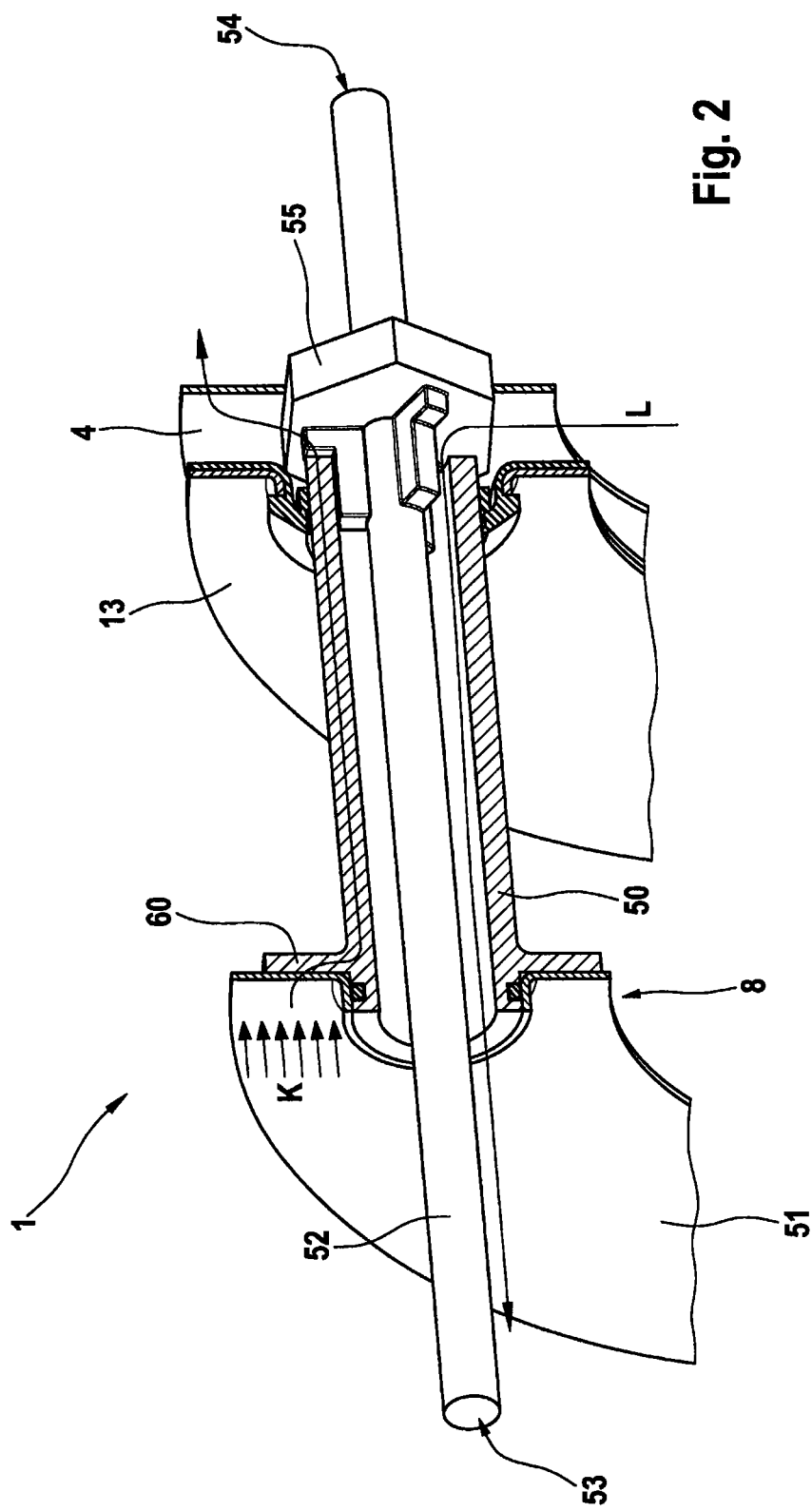
FIG. 2 shows a detail of a brake booster according to aspects of the invention in three-dimensional representation.
Figure 3:
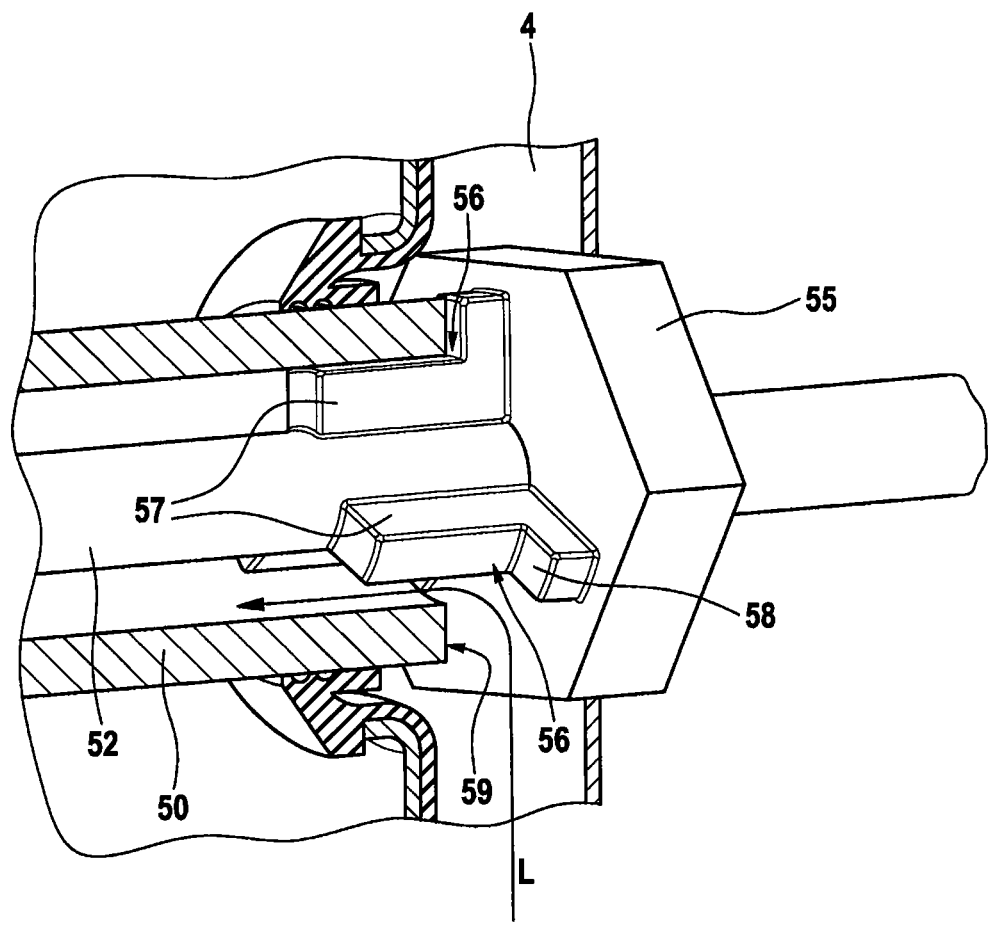
FIG. 3 shows an enlarged partial detail of FIG. 2.
Figure 4:
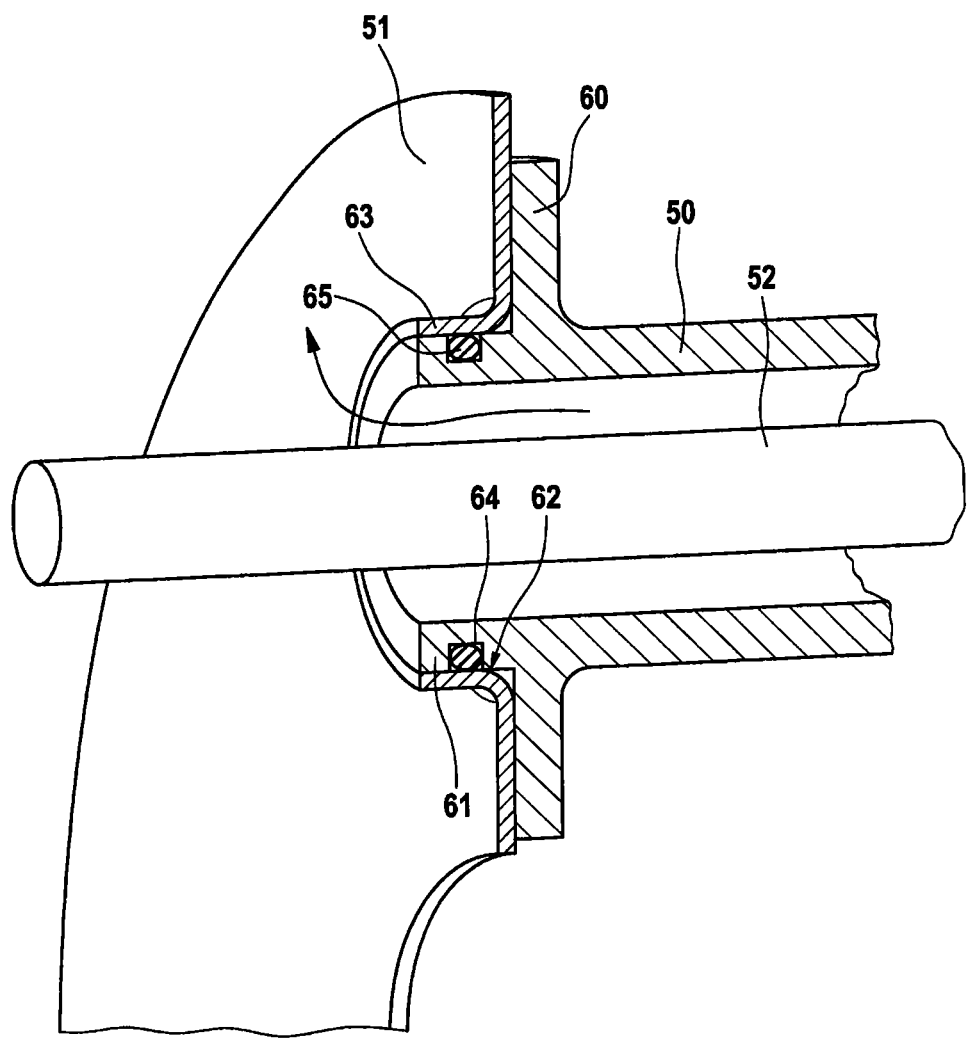
FIG. 4 shows another enlarged partial detail of FIG. 2.

FIGS. 2 to 4 show detail views of an illustrative embodiment of a tandem-type brake booster 1 according to aspects of the invention. The fundamental structure corresponds to the known brake booster described with reference to FIG. 1, and therefore identical components are provided with identical reference signs and the description is not repeated, although the invention is not limited to the illustrated embodiment of individual components and these can also be provided in a modified form. Only the significant differences with respect to the prior art shown will be discussed below.

In order to obtain an improved brake booster with respect to weight and costs, provision is made in the brake booster 1 according to aspects of the invention for the connecting conduit to be provided as a cylindrical sleeve 50 which penetrates a partition 51 and the second movable wall 13, said sleeve 50 allowing forces to be deflected from the partition 51 to the vehicle-mounted wall (not shown). As a result, the rearward-acting force arising from actuation is introduced into the vehicle-mounted wall via the sleeve 50 without imposing an additional load on the housing 2. The partition 51 is thus supported in a manner largely decoupled from the housing 2. These measures allow a significant reduction in the plate thickness of the housing 2. Moreover, this configuration of the air routing and deflection of forces makes it possible to simplify the design of the partition 51.

As will be understood from the following description, it is possible, within the scope of the invention, to provide the deflection of forces into the vehicle-mounted wall by supporting the sleeve 50 directly or indirectly against the second housing half shell 4.

In the variant of the brake booster shown in FIGS. 2 to 4, the brake booster 1 has at least one tie rod 52, which passes through the booster chambers 6, 7 and projects from the two housing half shells 3, 4 with a front and a rear end 53, 54. The front end 53 of the tie rod 52 is used to fix a master brake cylinder (not shown), which is pressed by means of a flange against a flat end face of the front housing half shell 3. The rear end 54 is used for the arrangement of a unit comprising the master brake cylinder and brake booster 1 on the vehicle-mounted wall of a motor vehicle, which can generally be placed directly against a flat end face of the housing half shell 4. Arranged on the other side of the vehicle-mounted wall, generally the "splash wall" or "firewall", is a "pedal bracket", through which the rear end 54 likewise passes in order ultimately to be screwed on in such a way, e.g. by means of a nut, that the desired fastening of the brake booster/master brake cylinder unit on the vehicle is accomplished.

As can be seen in FIG. 2 and especially in FIG. 3, which represent a detail of the brake booster 1 according to aspects of the invention, the tie rod 52 has a collar 55 to enable it to rest against an inner side of the housing half shell 4, it being possible, as shown, for said collar to have a hexagonal shape, for example.

To enable the sleeve 50 to be centered on the tie rod 52, the tie rod has at least two but preferably, as illustrated in FIGS. 2 and 3, three L-shaped ribs 56. A first leg 57 is formed integrally on the tie rod 52, and a second leg 58 extends along the collar 55 thereof. The end 59 of the sleeve 50 rests against the second leg 58 of the ribs 56, thus giving rise, between the collar 55 and the end 59 of the sleeve 50, to a flow cross section in a space between the ribs for the interchange of air between the two working chambers 15, 17. In FIGS. 2 and 3, the air flow L is shown clearly by the arrow L, and the deflection of forces is illustrated by the arrow K.

In an alternative embodiment (not shown) of the invention, the ribs can be provided on an inner side of the sleeve. It is possible in this case for the collar 55 of the tie rod 52 to rest against the ribs of the sleeve.

To allow deflection K of forces from the partition 51 via the sleeve 50, said sleeve has a radial collar 60, against which the partition 51 is supported, as can be seen, in particular, from FIG. 4.

The end region 61 of the sleeve 50 furthermore projects through a cavity 62 in the partition 51, the end region 61 resting against an axial collar 63 surrounding the cavity 62 in the partition 51. A sealing element 65 for sealing off the first working chamber 15 is provided in an encircling groove 64 in the end region 61 of the sleeve 50, said sealing element being designed as an O ring, for example. In this way, complex sealing of the first working chamber 15 can be eliminated.

The above-described configuration of the air routing and the deflection of forces advantageously makes it possible to simplify the configuration of the partition 51. As a result, said partition can be produced from aluminum, for example, to save weight.

To optimize weight and costs, the sleeve 27 is made from plastic or aluminum.

An embodiment which is not shown provides for the sleeve to be supported directly against the second housing half shell 4. To allow the air to flow between the two working chambers 15, 17, the sleeve in this case has, in the region of the second working chamber 17, one or more cutouts, via which the air can flow into a space within the sleeve.

The air routing described, by means of a sleeve, can also be employed with other variants of the brake booster.

Thus, for example, the brake booster can have at least one tubular reinforcing element, which extends through the housing 2 and rests against an inner side of the second housing half shell 4 by means of a contact element. Here, a screw element for fastening the brake booster on the vehicle-mounted wall is connected to the reinforcing element. In this embodiment too, the sleeve according to aspects of the invention can be supported against the contact element or directly against the housing half shell 4 and have one or more cutouts in the region of the second working chamber 17.

If another variant embodiment of the brake booster according to aspects of the invention has fastening elements 49 as shown in FIG. 1, which penetrate the second housing half shell 4 in order to fasten the brake booster on the vehicle-mounted wall and rest by means of a head flange against an inner side of the housing half shell 4, the sleeve can be supported against the head flange of a fastening element 49 or directly against the housing half shell 4 and have one or more cutouts in the region of the second working chamber 17.

The invention claimed is:

1. A tandem-type pneumatic brake booster for hydraulic vehicle brake systems comprising:
    a housing including a first housing half shell and a second housing half shell, the interior of which is divided at least in part by a partition into a front and a rear booster chamber, wherein the partition has a centrally arranged, circular cavity, through which a control housing or a cylindrical control housing extension extends, and wherein the partition rests sealingly against the control housing or the control housing extension by a sealing element,
    a first and a second movable wall, which respectively subdivide the front and the rear booster chamber into a first low-pressure chamber and a first working chamber and into a second low-pressure chamber and a second working chamber,
    at least one connecting conduit between the first working chamber and the second working chamber to equalize pressure between said two working chambers, wherein the connecting conduit is a cylindrical sleeve which penetrates the partition and the second movable wall, said sleeve being configured to allow forces to be deflected from the partition to a vehicle-mounted wall, and
    a tie rod having at least two ribs for centering the sleeve.

2. The pneumatic brake booster as claimed in claim 1, wherein the sleeve is supported directly or indirectly against the second housing half shell.

3. The pneumatic brake booster as claimed in claim 2, wherein the partition is supported against a radial collar on the sleeve.

4. The pneumatic brake booster as claimed in claim 3, wherein the sleeve has an encircling groove for accommodating a sealing element in an end region which rests against an axial collar surrounding a cavity in the partition.

5. The pneumatic brake booster as claimed in claim 1, wherein the partition is made of aluminum.

6. The pneumatic brake booster as claimed in claim 1, wherein the sleeve is made of plastic or aluminum.

7. The pneumatic brake booster as claimed in claim 1 wherein the tie rod penetrates the housing and a cavity in the partition in order to support the housing half shells and rests, by way of a collar of the tie rod, against an inner side of the second housing half shell, wherein the sleeve surrounds the tie rod, with the forces being deflected into the vehicle-mounted wall directly via the second housing half shell or via the collar of the tie rod.

8. The pneumatic brake booster as claimed in claim 7, wherein the sleeve has at least two ribs on an inner side to ensure centering on the tie rod.

9. The pneumatic brake booster as claimed in claim 8, wherein the collar of the tie rod rests against the ribs of the sleeve.

10. The pneumatic brake booster as claimed in claim 1, wherein the ribs are of L-shaped design with a first and a second leg, the second leg being formed integrally on the collar of the tie rod, and the sleeve resting on the second leg.

11. The pneumatic brake booster as claimed in claim 1 further comprising at least one tubular reinforcing element, which extends through the housing and rests against an inner side of the second housing half shell by way of a contact element, wherein a screw element for fastening the brake booster on the vehicle-mounted wall is connected to the reinforcing element, wherein the sleeve is supported against the contact element and has one or more cutouts in a region of the second working chamber.

12. The pneumatic brake booster as claimed in claim 1 further comprising fastening elements, which penetrate the second housing half shell in order to fasten the brake booster on the vehicle-mounted wall and rest, by way of a head flange, against an inner side of the second housing half shell, wherein the sleeve is supported against the head flange of a fastening element and has one or more cutouts in a region of the second working chamber.

13. A tandem-type pneumatic brake booster for hydraulic vehicle brake systems comprising:
   a housing including a first housing half shell and a second housing half shell, the interior of which is divided at least in part by a partition into a front and a rear booster chamber, wherein the partition has a centrally arranged, circular cavity, through which a control housing or a cylindrical control housing extension extends, and wherein the partition rests sealingly against the control housing or the control housing extension by a sealing element,
   a first and a second movable wall, which respectively subdivide the front and the rear booster chamber into a first low-pressure chamber and a first working chamber and into a second low-pressure chamber and a second working chamber,
   at least one connecting conduit between the first working chamber and the second working chamber to equalize pressure between said two working chambers, wherein the connecting conduit is a cylindrical sleeve which penetrates the partition and the second movable wall, said sleeve being configured to allow forces to be deflected from the partition to a vehicle-mounted wall,
   a tie rod within the sleeve and an air flow path between the tie rod and the sleeve, the tie rod being uniformly spaced from the sleeve around the complete circumference of the tie rod, and
   a tie rod collar uniformly spaced apart from a proximal end of the sleeve.

\* \* \* \* \*